No. 657,158. Patented Sept. 4, 1900.
J. DAVIS.
FILTER.
(Application filed Feb. 26, 1900.)
(No Model.)
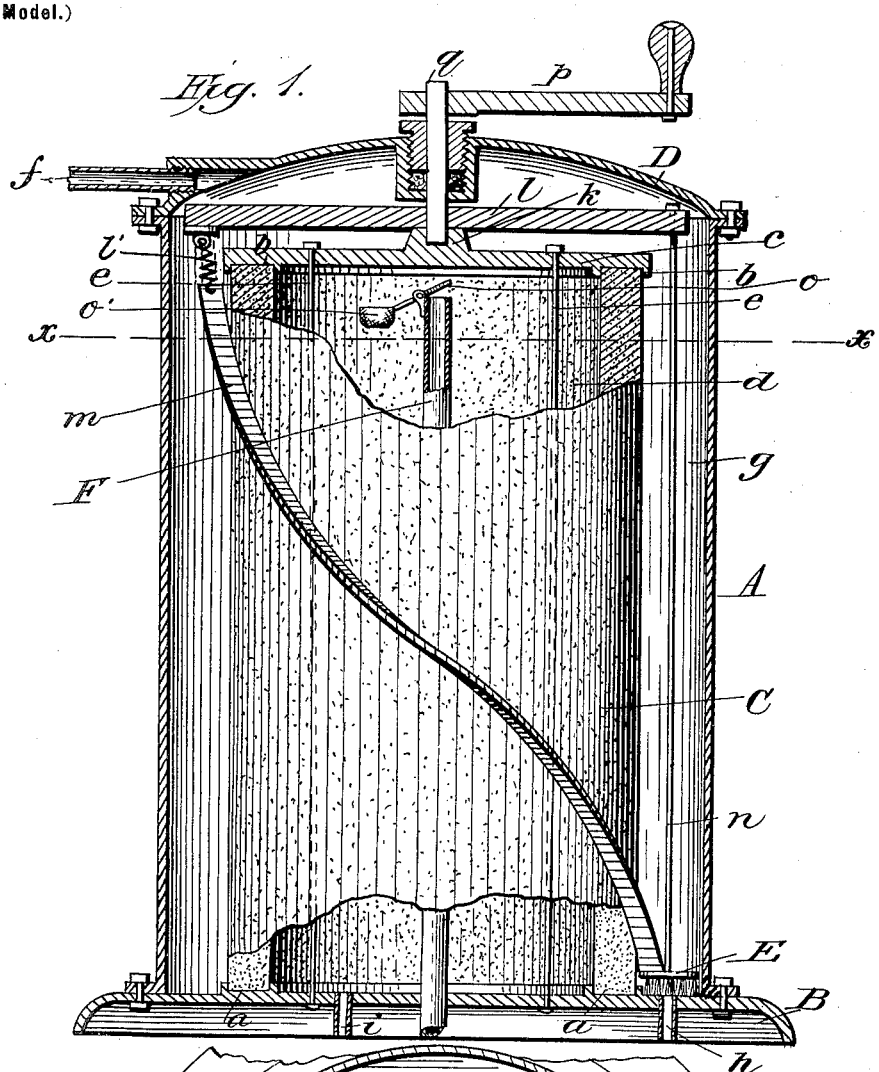
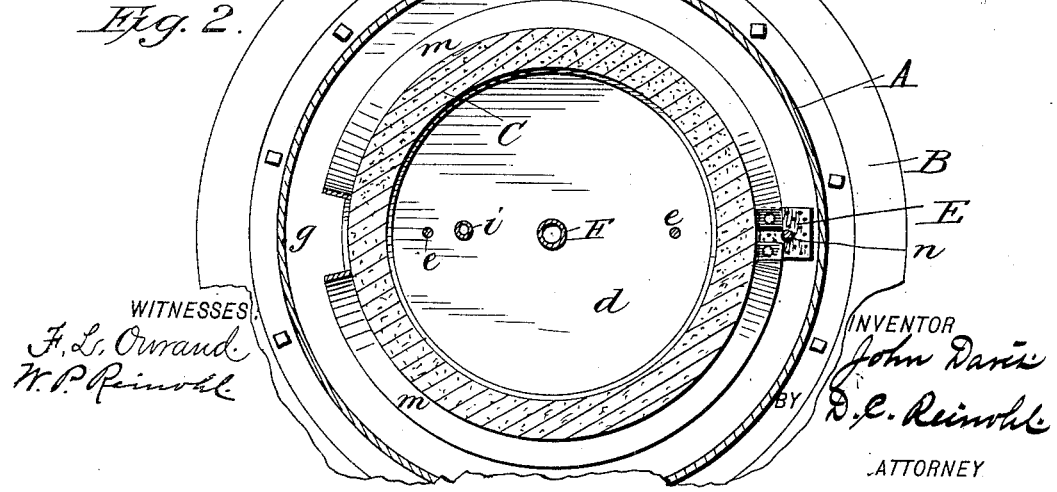
WITNESSES
F. L. Ourand
W. P. Reinohl
INVENTOR
John Davis
BY D. C. Reinohl
ATTORNEY

UNITED STATES PATENT OFFICE.

JOHN DAVIS, OF PITTSBURG, PENNSYLVANIA.

FILTER.

SPECIFICATION forming part of Letters Patent No. 657,158, dated September 4, 1900.

Application filed February 26, 1900. Serial No. 6,587. (No model.)

*To all whom it may concern:*

Be it known that I, JOHN DAVIS, a citizen of the United States, residing at Pittsburg, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My invention relates to filters, has especial reference to that class of filters known as "Pasteur," or "porous-wall" filters, has for its object the removal of the accumulated impurities from the filtering body and the bottom of the water-receiving chamber, and consists in certain improvements in construction which will be fully disclosed in the following specification and claims.

In the accompanying drawings, which form part of this specification, Figure 1 represents a vertical transverse section of a filter, showing part of the filtering-cylinder broken away; and Fig. 2, a horizontal section on line $x\ x$, Fig. 1.

Reference being had to the drawings and the letters thereon, A indicates the casing of the filter; B, the bottom, having an annular channel $a$ to receive the lower end of the filtering-cylinder C, the upper end of which is contained in a like channel $b$ in the plate or disk $c$, which forms the upper end of the filtered-water or storage chamber $d$ within the filtering-cylinder C and is secured in position on the cylinder C by rods or bolts $e$, which extend through said plate and screw into the bottom B. The casing is provided with a detachable cover D, to which is attached a supply-pipe $f$, and the water is discharged into the annular water-receiving chamber $g$, and the dirty water, with the impurities precipitated in chamber $g$ and accumulated on the outer surface of the cylinder C, after having been removed therefrom are discharged through the outlet or discharge pipe $h$ in the bottom of the filter. The filtered water is discharged from the storage-chamber $d$ through pipe $i$, also in the bottom of the filter. The several pipes $f$, $h$, and $i$ are supplied with suitable valves (not shown) for controlling the supply and discharge of water. The water passes from the chamber $g$ through the porous cylinder C into the chamber $d$, and the impurities which are not precipitated to the bottom of the chamber $g$ accumulate on the outer surface of the cylinder C and must be forcibly removed therefrom, and to effect the removal of said impurities I employ a cleaning device constructed as follows:

Upon the boss $k$ of the plate $c$ rests a horizontal bar $l$, to one end of which is attached on each side a short spiral spring $l'$, and to each of these springs is attached a spiral metallic flexible strip $m$, preferably lined on the side next to the cylinder with durable material (not shown) suitable to remove the impurities which adhere to its surface. These flexible spiral strips diverge in opposite directions, extending downward and half-way around the cylinder C to the opposite side from which they start, and lie just close enough to the cylinder to remove all accumulated impurities and yet not produce unnecessary friction, and at their lower ends said flexible strips are attached to a horizontal brush E, designed to remove the sediment, the result of precipitation, and the mud and other impurities detached from the cylinder C from the bottom of the chamber $g$ and discharge the same through pipe $h$. The brush E is also connected to the bar $l$ by a vertical rod $n$, whose upper end is secured to the end thereof opposite to the end to which the scrapers are secured.

F indicates an air-supply pipe provided with a valve $o$, controlled by a float $o'$, to admit air to the storage-chamber $d$.

In the use of the filter the scrapers and the brush are rotated by means of the crank $p$, connected to one end of the shaft $q$, which engages the bar $l$ and rests in the boss $k$, and the water supplied from the service-pipe and pipe $f$ is allowed to pass through the chamber $g$ until the impurities have been discharged through pipe $h$ and the water flows free from perceptible impurities.

Having thus fully described my invention, what I claim is—

1. A filter having a cylindrical filtering-body, an annular water-chamber, and a concentric water-chamber within the filtering-body; in combination with scrapers surrounding the filtering-body, extending from the upper to the lower end thereof, and a device for cleaning the bottom of the annular chamber and connected to the scrapers.

2. A filter having a cylindrical filtering-body, an annular water-chamber, and a water-storage chamber within the filtering-body; in combination with spirally-arranged scrapers connected at their upper and lower ends and extending half-way around said body in opposite directions from the upper to the lower end, and a brush engaging the bottom of said annular chamber and connected to the lower ends of said scrapers.

In testimony whereof I affix my signature in presence of two witnesses.

JOHN DAVIS.

Witnesses:
 EDW. A. HESS,
 T. A. McNARY.